US007134298B2

(12) United States Patent
Fukuyama et al.

(10) Patent No.: US 7,134,298 B2
(45) Date of Patent: Nov. 14, 2006

(54) METHOD OF PRESS-FORMING GLASS

(75) Inventors: Satoshi Fukuyama, Numazu (JP);
Hiroshi Murakoshi, Shizuoka-ken (JP);
Shusaku Matsumura, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 412 days.

(21) Appl. No.: 10/400,544

(22) Filed: Mar. 28, 2003

(65) Prior Publication Data
US 2003/0182964 A1 Oct. 2, 2003

(30) Foreign Application Priority Data
Mar. 29, 2002 (JP) ............................. 2002-094879
Mar. 29, 2002 (JP) ............................. 2002-097524

(51) Int. Cl.
*C03B 11/12* (2006.01)
*C03B 11/04* (2006.01)
(52) U.S. Cl. ..................... 65/29.19; 65/102; 65/319
(58) Field of Classification Search ............. 65/34, 65/102, 305, 306, 319, 161, 162, 268, 64, 65/275, 286, 32.1, 29.19; 264/1.1, 2.7, 2.4; 425/808, 406, 407
See application file for complete search history.

(56) References Cited
U.S. PATENT DOCUMENTS

| 5,228,894 A | * | 7/1993 | Sato et al. ..................... 65/102 |
| 5,346,522 A | * | 9/1994 | Komiyama et al. ............. 65/64 |
| 5,938,807 A | * | 8/1999 | Komiyama et al. ........ 65/29.12 |
| 6,003,339 A | * | 12/1999 | Morikita ..................... 65/275 |
| 6,370,918 B1 | * | 4/2002 | Fukuyama et al. ............ 65/319 |
| 6,848,274 B1 | * | 2/2005 | Murakoshi et al. ........... 65/319 |
| 2002/0098257 A1 | * | 7/2002 | Ikeda et al. .................. 425/374 |
| 2003/0056545 A1 | * | 3/2003 | Murakoshi et al. ........... 65/319 |

FOREIGN PATENT DOCUMENTS

| JP | 01146712 A | * | 6/1989 |
| JP | 01157423 A | * | 6/1989 |
| JP | 02149433 A | * | 6/1990 |
| JP | 04037613 A | * | 2/1992 |
| JP | 05-310434 | | 11/1993 |
| JP | 08208243 A | * | 8/1996 |
| JP | 09-030818 | | 2/1997 |
| KR | 1998-071587 | | 10/1998 |

OTHER PUBLICATIONS

Machine translation of JP 07-053221, retrieved from http://www.ipdl.ncipi.go.jp/homepg_e.ipdl on Nov. 3, 2005.*

(Continued)

*Primary Examiner*—Carlos Lopez
(74) *Attorney, Agent, or Firm*—Pillsbury Winthrop Shaw Pittman, LLP

(57) ABSTRACT

An object of the present invention is to provide a press-forming method for glass capable of uniformly heating press dies and a preform and preventing oxidation of the press dies. According to the press-forming method for glass of the present invention, a preform is placed between a pair of press dies in a press-forming chamber and the preform and the press dies are heated in an inert gas atmosphere. After the temperature of the press dies reaches a predetermined value, evacuation of the press-forming chamber is initiated. After the pressure of the press-forming chamber reaches a predetermined value and the temperature of the press-forming chamber are stabilized at a second predetermined value, the preform is press-formed. Preferably, an exhaust rate for evacuating the chamber is limited to a predetermined value or less.

13 Claims, 3 Drawing Sheets

OTHER PUBLICATIONS

Korean Office Action dated Feb. 16, 2005 for Appln. No. 10-2003-0019165

Japanese Office Action dated May 9, 2006 for Appln. No. 2002-094879.

* cited by examiner

METHOD OF PRESS-FORMING GLASS

CROSS-REFERENCE TO RELATED APPLICATIONS

This application is based upon and claims the benefit of priority from the prior Japanese Patent Applications No. 2002-094879, filed Mar. 29, 2002; and No. 2002-097524, filed Mar. 29, 2002, the entire contents of both of which are incorporated herein by reference.

BACKGROUND OF THE INVENTION

1. Field of the Invention

The present invention relates to a method and a machine for use in press-forming glass.

2. Description of the Related Art

Methods for manufacturing glass elements, such as optical lenses with high accuracy, are roughly classified into two groups: One group includes methods of grinding and polishing a glass material, whereas the other group includes methods of press-forming a glass material under elevated temperature.

The former method is employed generally to manufacture optical lenses. However, this method has problems. One is that more than ten steps are required for forming a curved surface. The other is that grinding and polishing produce a large amount of glass powder harmful to the operator. This method further has a drawback in that it is difficult to manufacture a large number of high-priced lenses having aspherical optical surface with the same accuracy.

On the other hand, the latter method employs a preform formed by cooling molten glass in a mold. The preform is heated again and subjected to press forming. In this manner, the pattern of press dies is transferred to the preform to produce an optical lens. This method is an advantage in that a curved surface is formed only in a single press-forming step. This method has another advantage: once the press dies is prepared, a large number of products can be manufactured with the same accuracy, which is determined by the accuracy of the press dies.

In the press-forming method, to increase the life of the press dies, press forming is desirably performed in an inert atmosphere or a vacuum. The press forming is performed by the following steps. First, a preform is placed between press dies. After the press-forming chamber housing the press dies and the preform is filled with an inert gas or evacuated, the press-forming chamber is heated by an infrared lamp (or a high-frequency heating unit). When the temperature of the preform reaches a predetermined value, the preform is subjected to press forming by use of the press dies. The press-formed product is thereafter cooled and taken out from the dies.

In recent years, various glass elements have been used in the optical communications field and the medical field. Of them, the optical elements made of quartz glass have been drawn attention by the reasons that they have a low thermal expansion rate, a small content of impurities, and an excellent ultraviolet light transmittance. There are a wide variety of quartz optical elements different in shape ranging from simple to complicated ones (e.g., a micro lens array) and different in size ranging from ultra micro to large ones.

A general optical lens is press-formed at a temperature at most about 700° C., whereas a quartz optical element at a higher temperature of about 1400° C. To perform press forming at such a high temperature, a high-power infrared lamp must be used.

During heating the press-forming chamber by an infrared lamp or maintaining it at a predetermined temperature, if the press-forming chamber is evacuated, gas flow is generated and deprives heat from the press dies and the peripheral members, with the result that the temperature of the press dies and a preform decrease. In particular, when a high-power infrared lamp is used, the temperature goes up and down (hereinafter, this phenomenon will be referred to as "temperature hunting") along with ON and OFF operations of the infrared lamp, which is performed to maintain the chamber at a preset temperature. As a result, the dimensional accuracy of the formed product deteriorates.

When the press dies and preform are surrounded by an inert gas atmosphere, heat is transmitted from the inert gas atmosphere to the press die and the preform. Since the heat of the inert gas atmosphere is equalized by convection, heat can be equally transferred to the press dies and preform. In contrast, when heating is performed after the press-forming chamber is evacuated, only the heat radiated from the infrared lamp is transmitted. In the case of a transparent preform, infrared rays pass through the preform and do not heat the preform, directly. Therefore, the preform is indirectly heated through heat transmission from the press dies.

A preform frequently used for forming a lens is in contact with the press dies at a small area. Since heat is transmitted only through the small area, a big difference in temperature is produced between the preform and the press dies. Since heat is supplied to the press dies from the outside by an infrared lamp, part of the press dies placed in the shadow of the press dies themselves is not irradiated with the infrared rays. As a result, when heating is performed only by radiation, the temperature difference easily occurs.

As described previously, to prevent oxidation of the press dies, the air of the press-forming chamber is purged and filled with an inert gas. However, it is difficult to completely purge the air retaining in small and thin portions of the die surfaces. It is therefore not easy to prevent oxidation of the press dies. Furthermore, when the press dies are placed in an inert gas atmosphere, a pattern of the press dies is not faithfully and accurately transferred to a preform. To improve the accuracy of the pattern transfer and prevent the oxidation of the press dies, reducing the pressure of the press-forming chamber is helpful rather than filling the chamber with an inert gas. Accordingly, a method performed in a low-pressure press-forming chamber is widely employed.

However, thermal behavior in the press-forming chamber differs between at normal pressure and reduced pressure. Even if a predetermined temperature is maintained by feedback control at normal pressure, inert gas flow is generated by evacuation of the press-forming chamber, changing temperature. Therefore, it takes time to stabilize the temperature. In some cases, the hunting of temperature is never settled. If the temperature of the press-forming chamber is not stabilized, it is difficult to obtain a high-quality press-formed product. In particular, when the hunting increases and temperature rises excessively high, the glass of a preform is thermally decomposed. As a result, the transparency of the glass decreases, failing to satisfy the specification for an optical element.

In addition, there is another problem: the position of the preform shifts on the press dies by gas flow when evacuation is initiated. Consequently, the dimensional accuracy of the press-formed product decreases.

BRIEF SUMMARY OF THE INVENTION

An object of the present invention is to provide a press-forming method for glass capable of uniformly heating press dies and a preform and preventing oxidation of the press dies. Another object of the present invention is to provide a method of press-forming glass capable of suppressing the hunting of temperature caused by evacuating a press-forming chamber, even if a high-power infrared lamp is used. A further object of the present invention is to provide a method of press-forming glass capable of preventing the position of a preform from shifting on press dies when a press-forming chamber is evacuated.

According to the present invention, there is provided a method of press-forming glass comprising:

placing a preform between a pair of press dies in a press-forming chamber;

heating the press dies and preform in an inert gas atmosphere;

initiating evacuation of the press-forming chamber after temperature of the press dies reaches a first predetermined value; and press forming the preform after pressure of the press-forming chamber reaches a predetermined value and the temperature of the press dies stabilizes at a second predetermined value.

It is preferable to suppress hunting of temperature of the press dies taking place when the press-forming chamber is evacuated.

The hunting of temperature of the press dies can be suppressed by controlling the evacuation rate.

The hunting of temperature can be suppressed by feedback control of temperature in accordance with a PID control system.

In this case, it is preferable that PID parameters be changed in the middle of heating the press dies and preform.

It should be noted that the PID parameters are changed based on the temperature of the press dies or internal pressure of the press-forming chamber.

The evacuation rate for evacuating the press-forming chamber is limited to not more than a predetermined value, thereby preventing the preform from moving over the press dies.

In this case, the evacuation rate is limited to not more than 1700 Pa/sec.

When the press-forming chamber is evacuated, the evacuation rate is specified by controlling an opening degree of a valve provided on an evacuation line based on the temperature or internal pressure of the press dies.

The evacuation rate may be limited to a small value by interposing a flow resistance element in the middle of the evaluation line. Examples of the flow resistance element include a butterfly valve, gate valve, baffle plate, tapered pipe, perforated plate, and porous material.

A press-forming machine for glass for carrying out the aforementioned method, comprising a pair of press dies;

a heater which heats the pair of press dies and a preform placed between the pair of press dies;

a press mechanism which applies press load to a heated preform from the behind to press-form the preform;

a press-forming chamber housing the press dies, atmosphere of the chamber being adjustable;

an evacuation unit which is connected to the press-forming chamber by way of an evacuation line and which evacuates the press-forming chamber; and a flow resistance element provided in the middle of the evacuation line to limit an evacuation rate.

Figure 1:
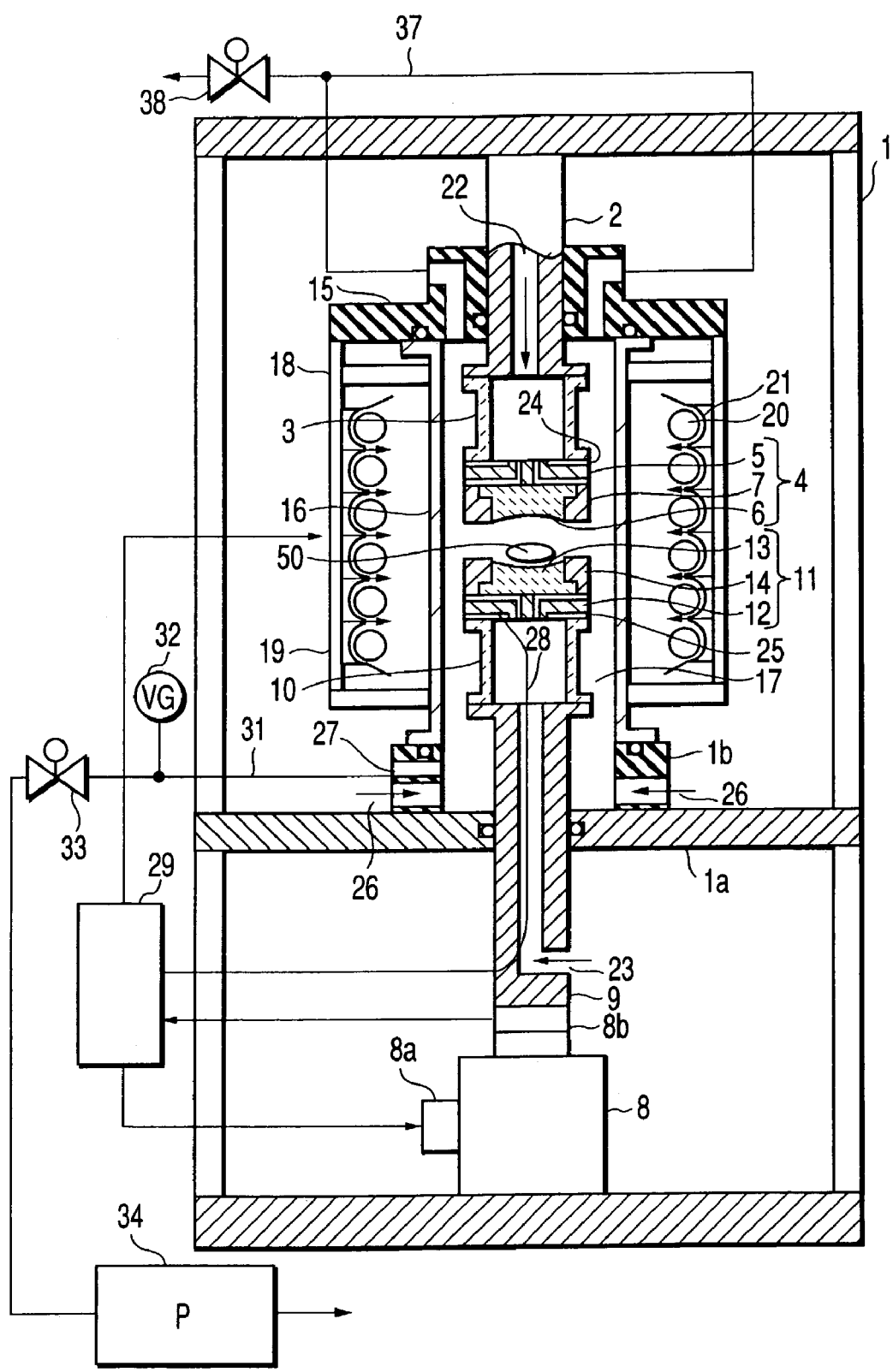
FIG. 1 is a schematic sectional view of a press-forming machine for glass by which the method of the invention is carried out.

DETAILED DESCRIPTION OF THE INVENTION (Embodiment 1)

The method according to the present invention is performed as follow. First, heating of press dies and a preform is initiated in an inert gas atmosphere. After the temperature of the press dies increases to a predetermined value, evacuation of a press-forming chamber is initiated. Subsequently, after the pressure of the press-forming chamber reaches a predetermined value and the temperature of the press dies is stabilized at a second predetermined value, press molding is performed. In this manner, the press dies and preform are uniformly heated while preventing the press dies from being oxidized. The first predetermined temperature (at which evacuation is initiated) is, for example, 800° C. The second predetermined temperature (at which press forming is performed) is, for example, 1400° C. The predetermined pressure herein is, for example, 3 Pa.

According to the method of the present invention, the evacuation rate for evacuating the press-forming chamber is limited to a predetermined small value to suppress hunting of the temperature. This enables gas flow generated by evacuation not to deprive the heat of the press dies and the peripheral members, thereby preventing a temperature decrease of the press dies and preform. As a result, even if a high-power infrared lamp is used to heat the press-forming chamber, the hunting of the temperature is successively suppressed during evacuation of the press-forming chamber and thereby the press-forming conditions are stabilized. Furthermore, by suppressing the hunting of temperature, the cycle time required for press forming can be reduced.

The evacuation rate is controlled in such a manner that the pressure of the press-forming chamber decreases from $1 \times 10^5$ Pa to 3 Pa in about 30 to 120 seconds. To limit the evacuation rate to a small value, the press-forming chamber may be evacuated via the flow resistance element (such as a butterfly valve, gate valve, flow-rate adjusting valve, or porous material), which is connected to an evacuation port.

By limiting the evacuation rate to a small value, the pressure of the press-forming chamber gradually decreases conversely with an increase of the temperature of the press-forming chamber and press dies. Since the oxidation of the press-forming chamber is greatly affected by the temperature of the atmosphere and oxygen concentration within the press-forming chamber, the oxidation of the press dies can be efficiently prevented by this method.

Furthermore, by limiting the evacuation rate to a small value, the shift of the position of a preform on the press dies can be prevented during evacuation.

According to another method of the present invention, the hunting of temperature is suppressed by feedback control in accordance with a proportional-plus-integral-plus-derivative (PID) control system. In this manner, the hunting of temperature is suppressed during evacuation of the press-forming chamber even if heat is supplied by a high-power infrared lamp, similarly to the case where the evacuation rate is controlled. It is therefore possible to stabilize the press-forming conditions.

Preferably, PID parameters are changed in the middle of heating. For example, under the condition that evacuation is to be initiated if the temperature of the press dies (measured by a temperature detector) exceeds 800° C. during a heating process, the PID parameters, which are used in the control loop, are changed based on the temperature of the press dies. More specifically, when the temperature of the press dies is less than 800° C., a first set of PID parameters is used. In the temperature range of 800 to 1000° C., a second set of PID parameters is used. When the temperature exceeds 1000° C., a third set of PID parameters is used. Each set of PID parameters has been previously determined based on experiments.

Alternatively, PID parameters may be changed on the basis of the internal pressure (measured by a pressure detector) of the press-forming chamber. To describe more specifically, the PID parameters are changed as follows. For example, when the pressure rises from normal pressure and reaches 100 Torr, a first set of PID parameters is used. In the range from 100 Torr to 10 Torr, a second set of PID parameters is used. When the pressure is less than 10 Torr, a third set of PID parameters is used. Each set of the PID parameters has been experimentally determined in advance.

The PID parameters during heating may be determined through calculation and/or by selecting from the list previously prepared on the basis of both temperature and pressure.

FIG. 1 shows a schematic sectional view of a press-forming machine to be used in the method according to the present invention.

A fixed shaft 2 extends downward from the upper portion of a frame 1. The lower end of the fixed shaft 2 provided with an upper die 4 via an insulating cylinder 3 made of ceramic. The upper die 4 is composed of a die plate 5 made of metal (ceramic or carbon may be used), a core 6 of made of ceramic (or super-hard alloy may be used), and a cavity die 7 which is part of the die surface and configured to fix the core 6 to the die plate 5. The insulating cylinder 3 is made of ceramic, such as silicon nitride or silicon carbide, having heat resistance and high-temperature strength.

On the lower portion of the frame 1, a drive unit 8 is arranged. The drive unit 8 used herein is composed of a servo motor 8a serving as a driving source and a screw jack for converting the rotary motion of the servo motor 8a to linear thrust. On the drive unit 8, a movable shaft 9 is fixed via a load cell 8b. The movable shaft 9 extends upward through an intermediate plate 1a so as to face the fixed shaft 2. The movable shaft 9 moves up and down under the control of the program (for controlling speed, position and load) stored in a control unit 29.

The upper end of the movable shaft 9 is provided with a lower die 11 via an insulating cylinder 10. The lower die 11 is composed of a die plate 12, a core 13 and a cavity die 14. Each of the insulating shaft 10, the die plate 12, core 13, and cavity die 14 is made of the same material as mentioned above. The temperature of the lower die 11 is detected by a thermocouple 28 attached to the lower die 11. A preform 50 to be subjected to press forming is placed on the lower die 11.

A vertically movable slide plate 15 is provided around the fixed shaft 2. The position of the slide plate 15 can be adjusted by a drive unit (not shown). The lower surface of the slide plate 15 is provided with a transparent quartz glass tube 16 having a flange and a jacket cylinder 18 surrounding the tube 16. The upper die 4 and the lower die 11 are surrounded by the quartz glass tube 16. The jacket cylinder 18 is equipped with an infrared lamp unit 19. The infrared lamp unit 19 has infrared lamps 20 and convex mirrors 21 positioned behind the lamps. The infrared lamp unit 19 heats the upper die 4 and lower die 11 through the quartz glass tube 16. Furthermore, a water-cooling pipe (not shown) is embedded in the convex mirror 21 for cooling it.

The contact surface between the upper end surface of the quartz glass tube 16 and the lower surface of the slide plate 15 is sealed with an O-ring. Similarly, the contact surface between the lower end surface of the quartz glass tube 16 and the upper surface of a plate 1b is sealed with an O-ring. Furthermore, the sliding surface between the through hole of the intermediate plate 1a and outer periphery of the movable shaft 9 is sealed with an O-ring. With this structure, the press-forming chamber 17 housing the upper die 4 and the lower die 11 is formed airtight, so that the atmosphere of the chamber 17 can be adjusted.

Gas supply pipes 22 and 23 are provided through the centers of the fixed shaft 2 and the movable shaft 9, respectively. Gas flow pipes 24 and 25 are provided within the upper die 4 and the lower die 11, respectively. An inert gas is supplied into the press-forming chamber 17 through gas supply pipes 22 and 23 and gas flow pipes 24 and 25 to create an inert gas atmosphere in the press-forming chamber 17. Note that the inert gas is also used to cool the upper die 4 and the lower die 11.

A slide plate 15 has a gas supply pipe 26 for cooling the quartz glass tube 16, the upper die 4 and the lower die 11. The gas supply pipe 26 is constructed so as to supply an inert gas into the press-forming chamber 17 at a predetermined flow rate via a flow controller (not shown). The inert gas supplied into the press-forming chamber 17 is exhausted from a gas exhaust line 37 via exhaust valve 38.

An evacuation port 27 is provided in the lower portion of the press-forming chamber 17. The evacuation port 27 is connected to a vacuum pump 34 through an evacuation line 31 having a vacuum gage 32 and a vacuum valve 33 provided in the middle. Note that a flow resistance element for adjusting an evacuation rate, such as a butterfly valve, gate valve, or porous material, may be arranged, if necessary, in the middle of the evacuation line 31, as described later.

It is required for the vacuum pump 34 to evacuate the press-forming chamber to a high vacuum of $10^{-6}$ Torr or less. Examples of the vacuum pump 34 include a mechanical pump, rotary pump, turbo molecular pump, diffusion pump, getter pump, sputter ion pump, and cryopump.

The pressure of the press-forming chamber 17 is detected by the vacuum gage 32. The control unit 29 controls the evacuation unit 34 based on the detection results by the vacuum gage 32 to evacuate the press-forming chamber 17 to a predetermined degree of vacuum. The control unit 29 feedback-controls an infrared lamp 20 in accordance with a PID control system based on the pressure of the press-forming chamber 17 (measured by the vacuum gage 32) and/or the temperature of the lower die 11 (i.e., measured by the thermocouple 28).

In the press-forming unit for glass shown in FIG. 1, press load is applied to the upper and lower dies 4, 11 from the behind to form the preform 50, thereby transferring the patterns of the die surfaces to the preform 50. A glass product such as an optical lens is manufactured in this manner.

The temperature of the press-forming chamber was measured by using the press-forming unit for glass shown in FIG. 1. The results of measurement will be explained below.

In this test, evacuation was initiated in the middle of heating. Temperature of the press dies during evacuation was measured to obtain temperature change. More specifically, after the press-forming chamber 17 was filled with an inert gas (nitrogen) at a pressure of $1 \times 10^5$ Pa, the infrared lamp 20 was turned on to heat the upper and lower dies 4, 11 and the preform 50. When the temperatures of the upper and lower dies 4, 11 stabilized at a temperature near 790° C., the vacuum valve 33 was opened to evacuate the press-forming chamber 17 to a pressure of 3 Pa. At this time, the evacuation rate was adjusted by controlling a degree of opening of the vacuum valve 33 so as to reach vacuum in about 60 seconds. The temperature of the press dies is measured by thermocouples (not shown), which are attached to the center portion and outer-peripheral portion of each of the core 6 of the upper die 4 and the core 13 of the lower die 11. On the basis of the measurement results, the thermal distribution of the upper and lower dies 4, 11 were obtained.

Figure 2:
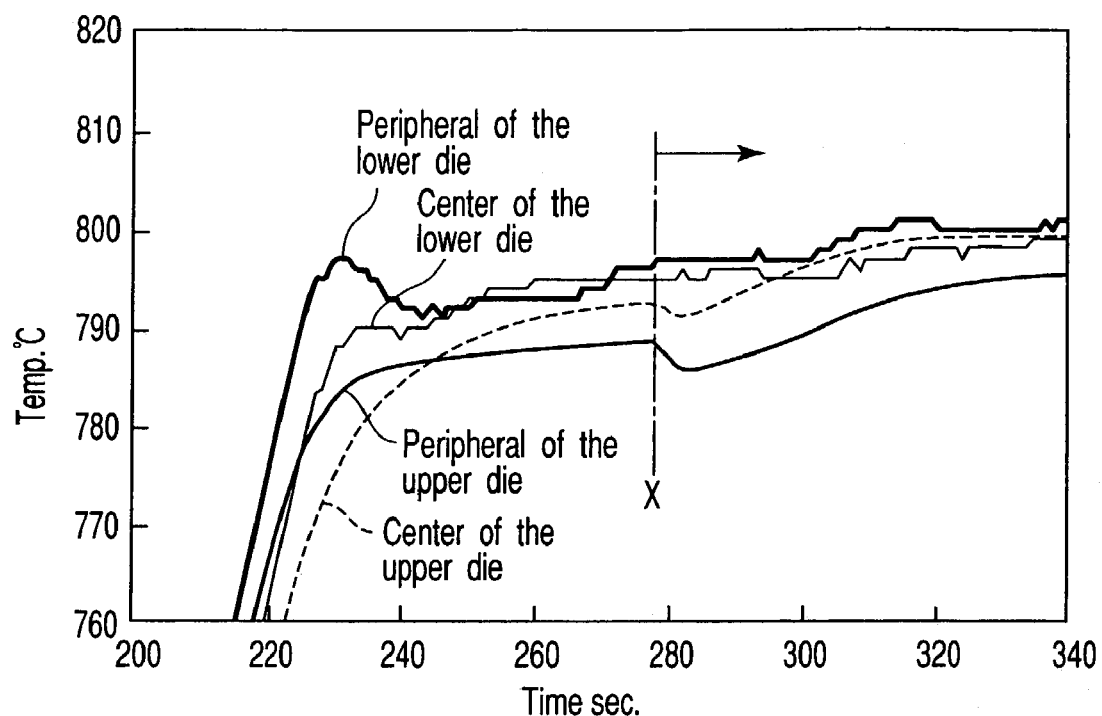
FIG. 2 is a graph showing the temperature change of press dies when the press dies and a preform are heated based on the method of the present invention.

FIG. 2 shows the temperature change of each of the aforementioned portions of the core 6 and core 13, which was obtained based on the measurement results. Note that reference symbol X in the figure denotes an evacuation initiation point.

Figure 3:
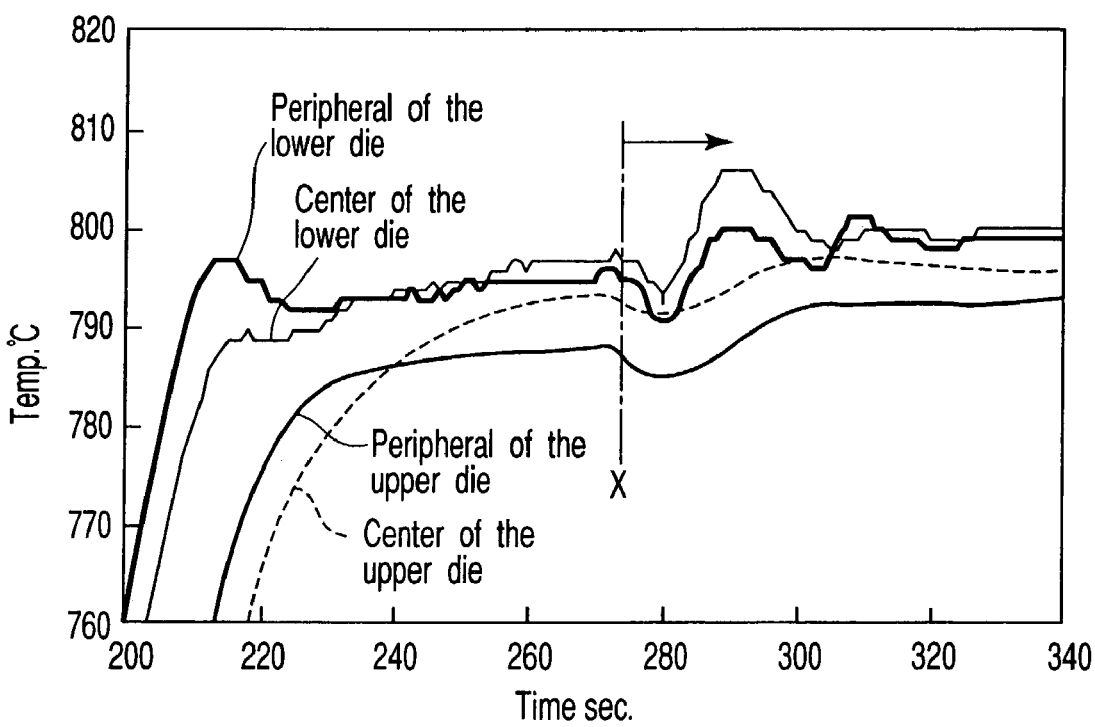
FIG. 3 is a graph showing the temperature change of press dies when the press dies and a preform are heated based on a conventional method.

FIG. 3 shows comparative data, which is temperature change in the case where the press dies and the preform were heated without controlling an evacuation rate. After the temperature of the upper and lower dies 4, 11 stabilized in the vicinity of the aforementioned temperature, a vacuum valve 33 is fully opened to perform evacuation. At this time, it took about 30 seconds to reach a vacuum. The other conditions were the same as those used in the test shown in FIG. 2. FIG. 3 shows the results of temperature change of each portion of the cores 6 and 13.

Figure 4:
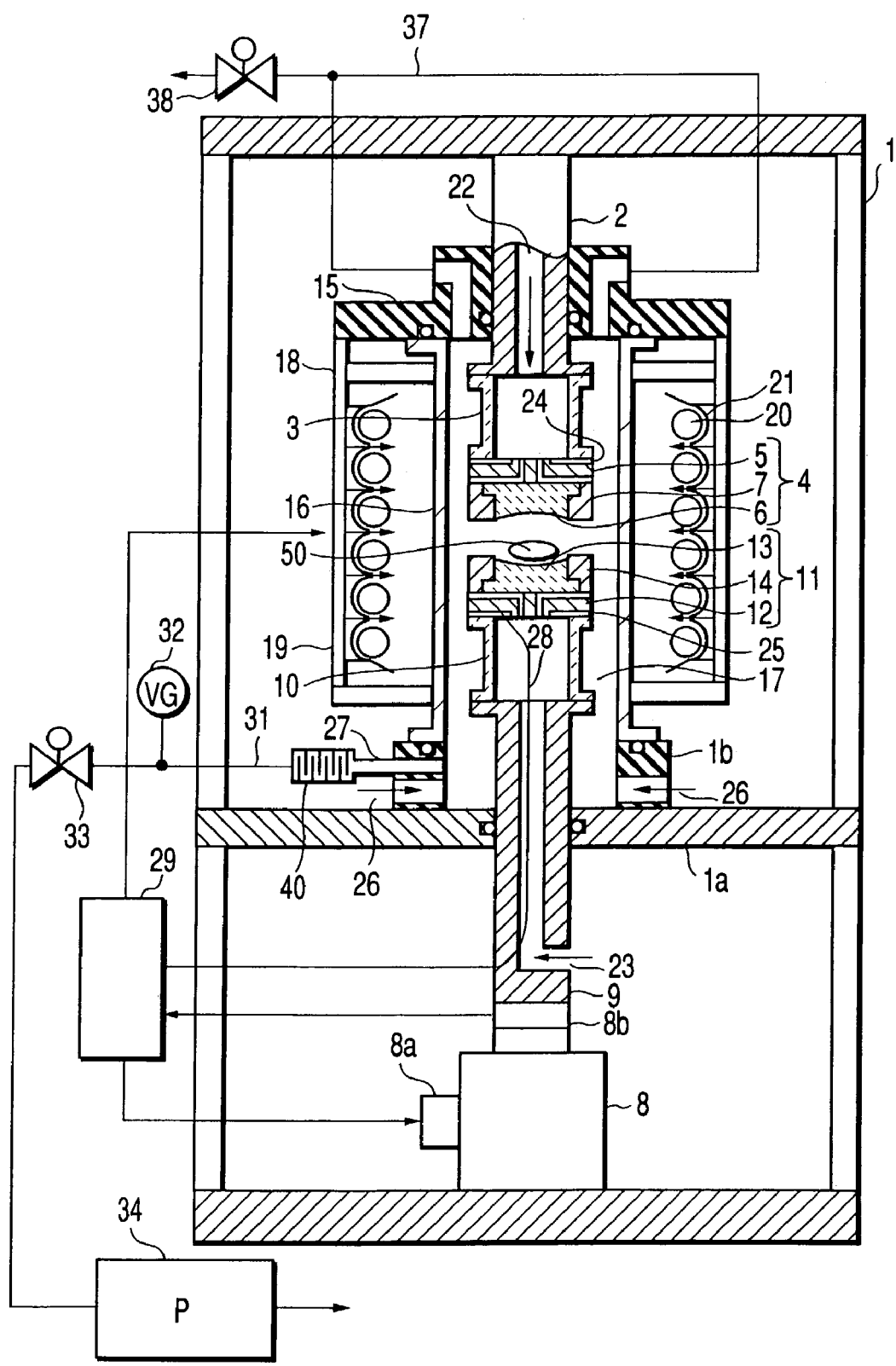
FIG. 4 is a schematic sectional view of another press-forming machine for glass by which the method of the present invention is carried out.

As is clear from FIGS. 3 and 4, the hunting of the temperature of the press dies can be suppressed by reducing an evacuation rate.

FIG. 4 shows a press-forming machine based on the present invention. In this embodiment, a flow resistance element 40 is inserted between the evacuation port 27 (formed in the lower portion of the press-forming chamber 17) and the evacuation unit 34. As the flow resistance element 40, a flow control value is used. Other structural elements of the press-forming machine for glass are the same as that shown in FIG. 1. Like reference numerals are used to designate the same structural elements corresponding to those shown in FIG. 1 and any further explanation is omitted for brevity's sake.

As shown in FIG. 4, since the flow resistance element 40 is arranged in the middle of the evacuation line for evacuating the press-forming chamber, the pressure of the press-forming chamber can be prevented from abruptly decreasing when evacuation is initiated. By gradually changing the pressure in the press-forming chamber in this manner, not only the temperature change of the press-forming chamber but also the shift of the position the preform on the press dies can be prevented.

According to the press-forming method for glass, press dies and a preform can be uniformly heated while preventing the oxidation of the press dies. According to the method of the present invention, even if a high power infrared lamp is used in press forming a material such as quartz glass, which has to be processed at high temperature, the hunting of the temperature can be suppressed when the press-forming chamber is evacuated. As a result, press forming can be performed under stable conditions to increase the quality of the formed product and reduce the cycle time. Furthermore, an evacuation rate can be suppressed to a small value, so that the position of the preform can be prevented from shifting on the press dies.

What is claimed is:

1. A method of press-forming glass comprising:
    placing a preform between a pair of press dies in a press-forming chamber;
    heating the press dies and preform in an inert gas atmosphere;
    initiating evacuation of the press-forming chamber after temperature of the press dies reaches a first predetermined temperature value, while continuing the heating of the press dies; and
    press forming the preform after pressure of the press-forming chamber reaches a predetermined pressure value and the temperature of the press dies stabilizes at a second predetermined temperature value which is higher than the first predetermined temperature value.

2. The method according to claim 1, wherein a hunting of temperature of the press dies, which occurs in evacuating the press-forming chamber, is suppressed.

3. The method according to claim 2, wherein the hunting of temperature of the press dies, which occurs in evacuating the press-forming chamber, is suppressed by controlling an evacuation rate.

4. The method according to claim 2, wherein the hunting of temperature of the press dies, which occurs in evacuating the press-forming chamber, is suppressed by feedback control of temperature in accordance with a PID control system.

5. The method according to claim 4, wherein PID parameters are changed in the middle of heating the press dies and preform.

6. The method according to claim 5, wherein the PID parameters are changed based on the temperature of the press dies.

7. The method according to claim 5, wherein the PID parameters are changed based on the pressure of the press-forming chamber.

8. The method according to claim 1, wherein an evacuation rate for evacuating the press-forming chamber is limited to not more than a predetermined value, thereby preventing the preform from moving over the press dies.

9. The method according to claim 8, wherein the evacuation rate for evacuating the press-forming chamber is limited to not more than 1700 Pa/sec, thereby preventing the preform from moving over the press dies.

10. The method according to claim 8, wherein, in evacuating the press-forming chamber, an opening degree of a valve provided on an evacuation line is controlled based on the temperature of the press dies.

11. The method according to claim 8, wherein, in evacuating the press-forming chamber, an opening degree of a valve provided on an evacuation line is controlled based on the pressure of the press-forming chamber.

12. The method according to claim 8, wherein the evacuation rate for evacuating the press-forming chamber is limited to a small value by interposing a flow resistance element in the middle of an evaluation line.

13. The method according to claim 12, wherein the flow resistance element is one selected from the group consisting of a butterfly valve, gate valve, baffle plate, tapered pipe, perforated plate, and porous material.

* * * * *